United States Patent

[11] 3,584,537

| [72] | Inventor | Burkhardt Schulz<br>Kellinghausen, Holstein, Germany |
|---|---|---|
| [21] | Appl. No. | 827,501 |
| [22] | Filed | May 26, 1969 |
| [45] | Patented | June 15, 1971 |
| [73] | Assignee | Danfoss A/S<br>Nordborg, Denmark |
| [32] | Priority | Apr. 23, 1968 |
| [33] | | Germany |
| [31] | | P 17 55 297.5 |

[54] HYDROSTATIC STEERING SYSTEM
4 Claims, 1 Drawing Fig.

[52] U.S. Cl........................................................ 91/411,
60/52S, 180/79.2
[51] Int. Cl......................................................F15b 11/16,
F15b 15/18
[50] Field of Search............................................ 91/411;
60/97 H; 11/52 S; 180/79.2

[56] References Cited
UNITED STATES PATENTS

| 3,009,322 | 11/1961 | Mercier......................... | 60/97HX |
| 3,270,507 | 9/1966 | Mercier et al. .............. | 60/51 |
| 3,349,744 | 10/1967 | Mercier et al. .............. | 60/52S |

Primary Examiner—Edgar W. Geoghegan
Attorney—Wayne B. Easton

ABSTRACT: The invention relates to adding of auxiliary apparatus to a conventional or standard hydrostatic steering system of the type in which a steering wheel controlled metering device controls the application of pressurized fluid to hydraulic motor means which operates the rod system of the wheels to be steered. The auxiliary apparatus allows a conventional metering system of relatively small size and capacity to be utilized for heavier vehicles than a system of a particular size or capacity could otherwise be used for. The auxiliary apparatus includes a valve which is operable in response to the pressure differential across the motor ports of the meter of the conventional system to provide greater operating forces for turning the wheels of the vehicle.

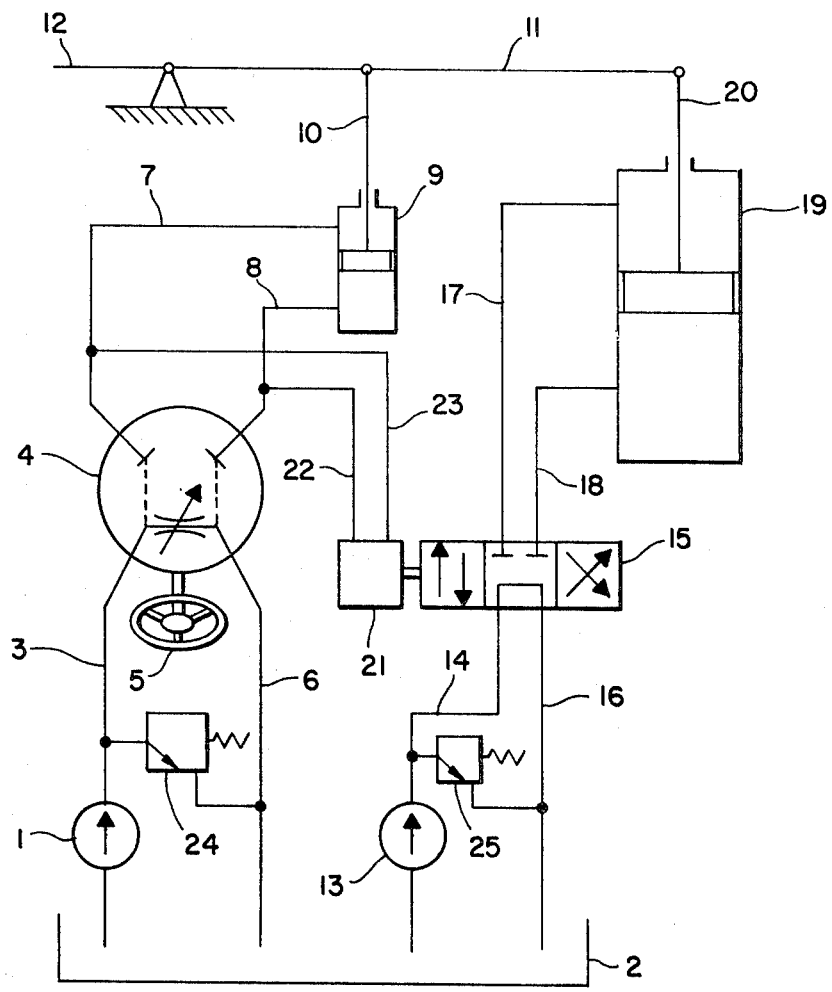

HYDROSTATIC STEERING SYSTEM

The invention relates to a hydrostatic steering system, particularly for heavy vehicles, wherein fluid under pressure is passed to a motor by way of a metering device in dependence upon the displacement of an actuating means, e.g. a steering wheel.

Various constructions of hydrostatic steering systems of this kind are known. In one arrangement (U.S. Pat. No. Re 25,126), the changeover and cutoff valve is formed on a rotary slide, one sleeve of which is connected to the steering wheel and the other sleeve of which is connected to the rotor of a metering motor. When the steering wheel is turned, the valve is opened in the required direction. It remains open until so much fluid under pressure has passed through the metering motor to the work motor that the second sleeve follows the rotation of the first sleeve. In another arrangement (U.S. Pat. No. 2,020,951) the steering wheel is connected to a metering pump. The cutout and changeover valve opens in the required direction and remains open when and so long as the pump produces a pressure differential at the valve. These systems usually incorporate the feature that, when the pressure pump fails, the metering device can be rotated manually by means of the steering wheel and emergency control can be carried out in this way.

Difficulties arise, however, when work motors having a large displacement volume, as required in particular for heavy vehicles, have to be controlled. If the steering system is simply increased in size to an extent corresponding to the size of the work motor, the system becomes large, heavy and clumsy. If a metering pump is connected to the steering wheel, considerable strength is required on the part of the driver to produce the pressure differential for actuating the changeover and cutoff valve. In any case, the driver will not have sufficient strength to displace manually the wheels to be steered in the case of emergency control becoming necessary. If, however, the size of the steering system is not changed, a complete revolution of the steering wheel results in only a very small displacement of the steered wheels. In particular, it is no longer possible by means of a few, e.g. three, revolutions of the steering wheel to turn the steered wheels from the position in which they are fully deflected to the left to that in which they are fully deflected to the right. The connecting of stepup gearing to the steering wheel also causes difficulties since excessively big effort would have to be used for the emergency control and for normal operation too when a metering pump is used.

The object of the invention is to enable a large work motor to be displaced using a steering system that is of normal size, is actuated in the normal manner and requires a normal amount of force for its actuation.

According to the invention, this object is achieved by measuring the pressure drop at the work motor and, in dependence thereon, opening a valve having two operational positions and a neutral position, which valve passes the fluid under pressure to a second work motor which is mechanically connected in parallel with the first work motor.

As is normal in steering systems of this kind, the first work motor travels a distance proportional to the displacement movement of the actuating means. As long as fluid under pressure is flowing through this system, a pressure drop occurs at the first work motor. This pressure drop is dependent upon direction. The valve actuated by this pressure drop therefore opens in a manner dependent upon direction as long as the first work motor is displaced. Fluid under pressure is therefore passed to the second work motor as long as the first work motor is displaced. Since both work motors are mechanically coupled to each other, a return movement takes place such that the position of the second work motor corresponds each time to the position of the first work motor and therefore to the position of the actuating means.

In particular, the second work motor may be larger than the first. In the extreme case, the second work motor acts as the actual work motor, whilst the first work motor is merely provided as a return unit.

Expediently, a separate pump is associated with the system for the first work motor and the system for the second work motor, one for each. This has the advantage that the pump for the larger work motor is located directly in the vicinity thereof and flow losses can be avoided in this manner. Moreover, emergency control is rendered easier since if one of the pumps fails, the equipment can still be operated with the help of the other pump.

The invention will now be described in more detail by reference to a connection diagram.

A normal hydrostatic steering system contains a pump 1, which supplies oil from a tank 2 to control equipment 4 by way of a pressure pipe 3. The control equipment may be of a construction such as is described in U.S. Pat. No. Re 25,126. In the neutral position of the control equipment, the oil under pressure is returned directly to the discharge pipe 6 through a bypass. In the two working positions, the oil is delivered through one of the connecting pipes 7 or 8 to the first work motor 9 and is returned through the other connecting pipe. The piston rod 10 of the work motor is connected to a lever 11, the free end 12 of which can actuate the rod system for the wheels to be steered.

A second system incorporates a pump 13 which passes oil from the same tank 2 to a three-position valve 15. In the neutral position, the oil can flow direct to the discharge pipe 16 by way of a bypass. In the two operational positions, the oil is passed in one or other direction through the connecting pipes 17 and 18 to a second larger work motor 19, the piston rod 20 of which is likewise connected to the lever 11. The valve 15 is controlled by a pressure-differential-measuring means 21, which is connected to the connecting pipes 7 and 8 by way of two metering pipes 22 and 23.

When the control equipment 4 occupies its neutral position as illustrated, no oil flows through the connecting pipes 7 and 8. No pressure differential occurs at the work motor 9 and the valve 15 also occupies the neutral position as illustrated. If, however, the steering wheel 5 is turned and oil under pressure is directed by way of the connecting pipe 7 to the working motor 9 and therefrom through the connecting pipe 8, for example, a pressure drop occurs from pipe 7 to pipe 8, which pressure drop actuates the pressure-differential-measuring means 21 in such manner that the valve 15 is pushed to the right. Consequently, the pump passes oil under pressure into the motor 19 is such manner that the latter is moved in the same direction as the motor 9. Since the two motors are coupled by way of the lever, synchronism of the motor is ensured. When the steering wheel is turned in the opposite direction, oil under pressure is supplied to the motor 9 through the pipe 8 and discharged through the pipe 7. The valve 15 is then displaced to the left, so that in this case too the work motor 19 can follow the movement of the motor 9.

Relief pressure governors 24 and 25 are associated with the two pumps in known manner.

If the pump 13 fails, only the first system continues to operate on the lever. If the forces to be overcome are not too great, this suffices for emergency control purposes. If required the pipes 7 and 8 can be connected directly to the second work motor 19 to provide increased power. If the pump 1 fails, the metering motor of the control equipment 4 can be driven manually as a pump with the help of the steering wheel 5. This pump produces a pressure drop between the pipes 7 and 8, whereby the system for the second motor can normally be set in operation.

The motors 9 and 19 may also be rotary work motors. The valve 15 can take the form of a rotary slide.

What I claim is:

1. A hydrostatic steering system comprising a metering device having inlet and outlet ports and two motor parts, a valve having two operative positions and a neutral position, parallel fluid supply means for said metering device and said valve, motor means connected to said motor ports and to said valve, and pressure-differential-sensing means connected between said motor ports and said valve for controlling said valve in accordance with the pressure differential between said motor ports.

2. A hydrostatic steering system in accordance with claim 1 in which a first motor is connected to said motor ports and a second motor is connected to said valve.

3. A hydrostatic steering system according to claim 2 in which said second motor is larger than said first motor.

4. A hydrostatic steering system in accordance with claim 1 in which separate pump means are provided for said parallel fluid supply means.